(12) United States Patent
Heidloff et al.

(10) Patent No.: US 7,505,954 B2
(45) Date of Patent: Mar. 17, 2009

(54) SEARCH BAR WITH INTELLIGENT PARAMETRIC SEARCH STATEMENT GENERATION

(75) Inventors: Niklas Heidloff, Salzkotten (DE); Michael R. O'Brien, Westford, MA (US); Gregory Robert Klouda, Lancaster, MA (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 10/920,985

(22) Filed: Aug. 18, 2004

(65) Prior Publication Data

US 2006/0041545 A1   Feb. 23, 2006

(51) Int. Cl.
*G06F 17/30* (2006.01)
*G06F 3/00* (2006.01)

(52) U.S. Cl. .......................... 707/1; 707/100; 707/200; 715/738

(58) Field of Classification Search ............... 707/1–10, 707/102, 104.1, 200, 100; 709/206, 223; 715/760, 854, 738, 744
See application file for complete search history.

(56) References Cited

U.S. PATENT DOCUMENTS 5,890,163 A   3/1999   Todd
6,216,122 B1   4/2001   Elson
6,401,097 B1   6/2002   McCotter et al.
6,643,694 B1   11/2003   Chernin
6,907,424 B1*   6/2005   Neal et al. ..................... 707/3
7,225,407 B2*   5/2007   Sommerer et al. .......... 715/738
2002/0033844 A1*   3/2002   Levy et al. .................. 345/744
2002/0049858 A1   4/2002   Frietas et al.
2002/0090933 A1   7/2002   Rouse et al.
2002/0184317 A1*   12/2002   Thankachan ................ 709/206
2003/0041112 A1   2/2003   Tada et al.
2003/0212891 A1   11/2003   Evans et al.

* cited by examiner

*Primary Examiner*—John Breene
*Assistant Examiner*—Fred I Ehichioya
(74) *Attorney, Agent, or Firm*—Guerin & Rodriguez LLP; William G. Guerin

(57) ABSTRACT

Described is a method for generating a parametric search statement for finding a target document. The parametric search statement is generated in the text boxes of a search bar. A user action is performed in the text box. An in-place context menu having menu items responsive to the user action are displayed near the location of the user action. Each menu item includes at least one of an attribute of the target document, a comparison operator and a value. One of the menu items is selected from the in-place context menu based on a known characteristic of the target document. Parametric search statements are easily generated using the method without the need to access numerous dialogs boxes or to enter significant text.

6 Claims, 5 Drawing Sheets

SEARCH BAR WITH INTELLIGENT PARAMETRIC SEARCH STATEMENT GENERATION

FIELD OF THE INVENTION

The invention relates generally to the generation of search statements for finding documents or files. In particular, the invention relates to a method for generating parametric search statements using in-place context menus.

BACKGROUND OF THE INVENTION

Many client applications do not offer a convenient way to quickly retrieve documents. For example, mail clients (e.g., Lotus Notes (International Business Machines, Armonk, N.Y.) and Microsoft Outlook (Microsoft Corporation, Redmond, Wash.)) do not provide easy access to specific messages maintained in a mailbox. To organize messages for later retrieval users often maintain multiple mail folders. Each folder contains emails that share a common characteristic. For example, a folder can hold messages relating to a specific task or project. Ideally a user seeking to obtain an earlier message knows which folder contains that message. If the number of folders is low, then there can be numerous messages in each folder. Significant user effort is required to sort through messages in the folder to find the message of interest. In other situations, users may not remember to which folder they moved the message. Moreover, user interfaces typically only permit a user to find a raw word in the selected folder or to sort the first column and then jump to the first of the emails starting with a predetermined prefix.

The user interfaces provided in typical email client applications permit typed input in a search bar that is visible in the main application window or is otherwise accessible from the main application window. Using this search bar it is generally only possible to search for plain text in any part (e.g., header or body) of the email document. Parametric searches are generally implemented using complex user interfaces.

Parametric searches are significantly different than searches implemented on the Internet. Web search engines often perform searches for information which may not exist. Email message searches, however, are primarily implemented for retrieval. The user knows that the sought email message exists and whether the email message was sent or received. Frequently, the user knows the name of the sender or the recipient and the time period during which the email message was transmitted or received. These parameters significantly reduce the quantity of emails in the search results. Unfortunately, the parameters are not easily and quickly defined in the search statement. If a parametric search is required, the user navigates through multiple pop-up boxes to generate the proper search statement.

What is needed is a method for generating parametric search statements for finding and retrieving emails and other documents. The present invention satisfies this need and provides additional advantages.

SUMMARY OF THE INVENTION

In one aspect, the invention features a method for generating a parametric search statement in the text box of a search bar for finding a target document. A user action is performed at a location in the text box of the search bar. An in-place context menu having a plurality of menu items responsive to the user action is displayed in a position proximate to the location of the user action in the search bar. Each menu item includes at least one of an attribute of the target document, a comparison operator and a value. One of the search terms is selected from the in-place context menu based on a characteristic of the target document.

In another aspect, the invention features a computer program product for generating a parametric search statement for finding a target document. The computer program product includes a computer useable medium having embodied therein program code. The program code includes program code for enabling a user to perform a user action at a location in a text box of a search bar and program code for displaying an in-place context menu having a plurality of menu items responsive to the user action. The in-place context menu is displayed in a position proximate to the location of the user action. Each menu item includes at least one of an attribute of the target document, a comparison operator and a value. Also included is program code for enabling a user to select one of the menu items from the in-place context menu based on a characteristic of the target document.

In another aspect, the invention features a computer data signal embodied in a carrier wave for generating a parametric search statement for finding a target document. The computer data signal includes program code for enabling a user to perform a user action at a location in a text box of a search bar and program code for displaying an in-place context menu having a plurality of menu items responsive to the user action. The in-place context menu is displayed in a position proximate to the location of the user action. Each menu item includes at least one of an attribute of the target document, a comparison operator and a value. Also included is program code for enabling a user to select one of the menu items from the in-place context menu based on a characteristic of the target document.

In another aspect, the invention features an apparatus for generating a parametric search statement for finding a target document. The parametric search statement is generated in the text boxes of a search bar. The apparatus includes means for performing a user action at a location in the text box of the search bar and means for displaying an in-place context menu having a plurality of menu items responsive to the user action. The in-place context menu is displayed in a position proximate to the location of the user action in the search bar. Each menu item includes at least one of an attribute of the target document, a comparison operator and a value. The apparatus also includes means for selecting one of the menu items from the in-place context menu based on a characteristic of the target document.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In brief overview the present invention relates to a method for generating a parametric search statement to find a particular document (i.e., a "target" document) about which one or more characteristics or properties are known. The method is implemented with a user interface to define the search statement easily with parameters for powerful full-text searches. The parametric search statement is generated in the text box of a search bar. A user seeking the target document performs a user action at a location in the text box such as entering text, executing a user interface function (e.g. a right mouse click), and the like. An in-place context menu is displayed near the location in the text box where the user action occurred. The menu is context based because it provides menu items for selection based on what has already been entered in the search bar. Menu items can include document attributes, comparison operators and values. Search clauses are a combination of an attribute, a comparison operator and a value to complete a logical parametric definition and can be displayed through abbreviation as menu items. The most typical attributes, comparison operators, values and search clauses are listed first in their respective regions of the in-place menu so that users can select these menu items easier than less common menu items displayed lower in the menu. The user selects each menu item based on a characteristic or property of the target document. Display of in-place context menus and selection of menu items is repeated to build a parametric search statement having multiple parameters. Advantageously, parametric search statements are easily formed without the need to access numerous dialogs boxes or to enter significant text. Moreover, the user does not need to sort documents into folders to facilitate later searches.

Figure 1:
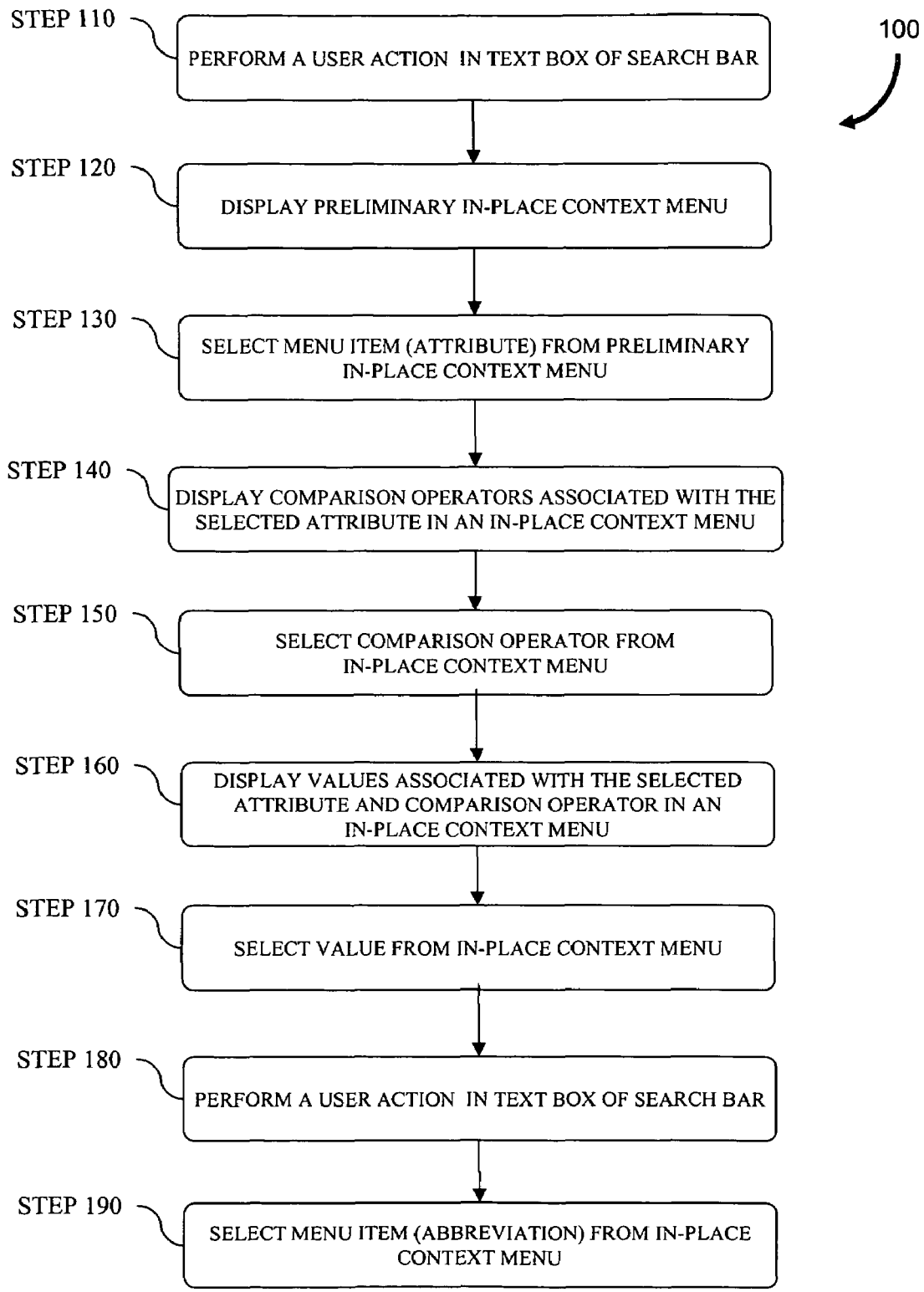
FIG. 1 is a flowchart representation of an embodiment of a method for generating a parametric search statement for finding a target document according to the invention.

FIG. 1 shows a flowchart of an embodiment of a method 100 for generating a parametric search statement for finding a target document according to the invention and is referred to below in conjunction with the descriptions of FIG. 2 to FIG. 12 below. In the illustrated embodiment, the user is executing an email application. In other embodiments, the user can execute other applications which access other types of documents.

Figure 2:
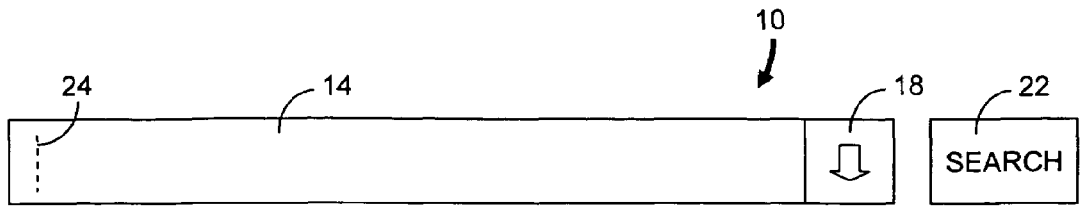
FIG. 2 is an illustration of a search bar for generating a parametric search statement for finding a target document according to an embodiment of the invention.

The method 100 includes performing (step 110) a user action at a location in the text box of a search bar. FIG. 2 illustrates a search bar 10 for an email client application. The search bar 10 includes a text box 14, a drop down button 18 and a search button 22. The text box 14 enables a user to enter text to generate a search statement for finding one or more email messages of interest to the user (i.e., target documents). The drop down button 18 allows the user to recall recent searches and the search button 22 is selected to initiate execution of the search defined by the search statement currently in the text box 14. The user action can be the execution of a user interface function (e.g., a right button mouse click). Alternatively, the user action can be the typing of one or more alphanumeric characters in the text box 14. Location, as used herein, means the screen position of a cursor or mouse pointer inside the text box 14, or the current place 24 (e.g., cursor location) for entry of text in the text box 14.

Figure 3:
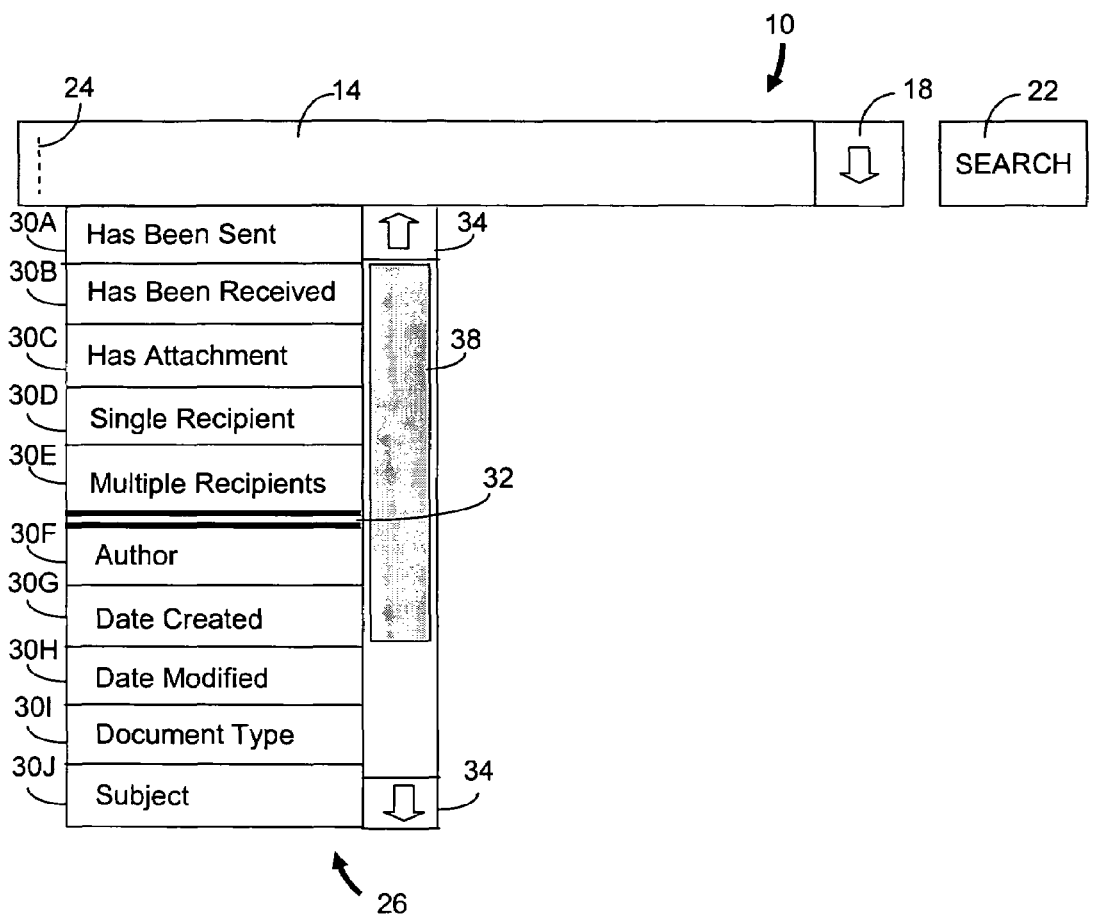
FIG. 3 is an illustration of the search bar of FIG. 2 with a preliminary in-place context menu.

As shown in FIG. 3, a preliminary in-place context menu 26 is displayed (step 120) near the location 24 of the user action in response to the user action. The user chooses (step 130) one of the menu items 30A to 30J (generally 30). The upper listed menu items 30A to 30E are abbreviations for complete search clauses. The lower listed menu items 30F to 30J are attributes and represent only the first term in a search clause. A double line 32 is used to distinguish the abbreviations 30A to 30E for complete search clauses from the attributes 30F to 30J.

A complete search clause includes a document attribute combined with a comparison operator and a value. For example, "Has Attachment" 30C is the abbreviation for the complete search clause "Attachment equals true" where "Attachment" is an attribute, "equals" is the comparison operator and "true" is the value. Similarly, "Multiple Recipients" 30E is the abbreviation for the complete search clause "Number of recipients is greater than one" where "Number of Recipients" is the attribute, "is greater than" is the comparison operator and "one" is the value. Comparison operators can also have other forms such as does not equal, less than, before, after and the like. Values can be numerical values, logical values, character values and the like. The abbreviations assist the user in quickly generating the search statement by including all the terms in the search clause with a single selection of a menu item 30. Other search clauses than those shown as abbreviations in the illustrated in-place context menu 26 are possible, such as whether the target document is larger than a predetermined number of bytes and when the target document was received. For example, receipt of an email can be specified to have occurred in a predetermined time interval (e.g., last month).

Choosing a menu item 30 is achieved by positioning a mouse pointer or cursor over the desired menu item 30 and clicking a mouse button, depressing a "hot key" or entering a defined key combination. Alternatively, choosing the menu item 30 is accomplished by typing the first few letters of the desired menu item 30 at the current text entry location 24. Although ten menu items 30 are shown, other numbers of menu items 30 are possible. Scroll buttons 34 and a sliding scroll bar 38 allow the user to view and select one of the menu items 30 in the preliminary in-place context menu 26 that is not currently visible.

Figure 4:
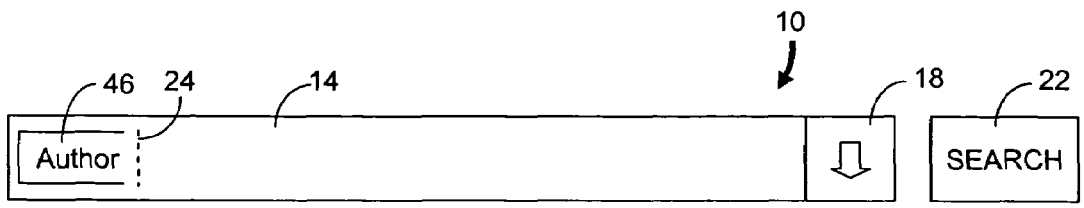
FIG. 4 is an illustration of the search bar of FIG. 2 showing a selected attribute.
Figure 5:
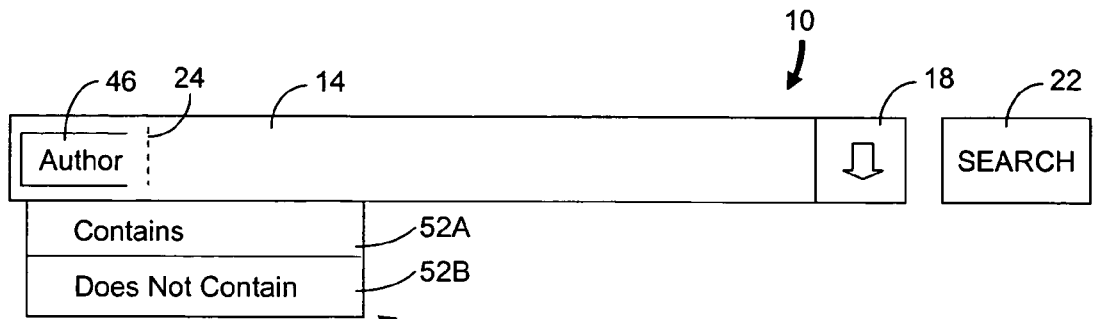
FIG. 5 is an illustration of the search bar of FIG. 4 showing an in-place context menu for the selection of a comparison operator.
Figure 6:
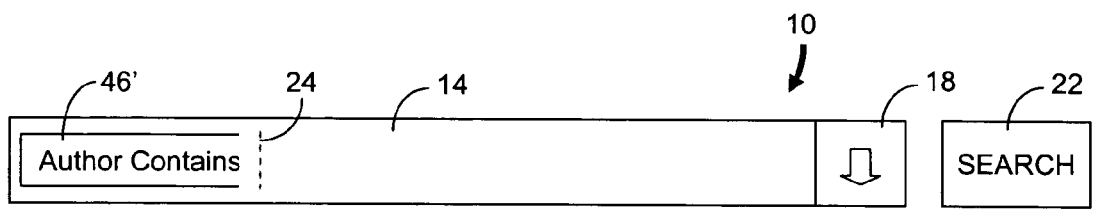
FIG. 6 is an illustration of the search bar of FIG. 5 showing the selected attribute and a selected comparison operator.

FIG. 4 shows the search bar 10 with a partial search clause 46 entered based on an attribute selected from the preliminary in-place context menu 26. The selected attribute is displayed as text inside a rectangular border open on the right side to indicate that the search clause 46 is incomplete because a comparison operator and a value are required. An in-place context menu 50 is displayed (step 140) near the current text entry location 24 close to the attribute as shown inn FIG. 5 either automatically or in response to a user action. The in-place context menu 50 lists comparison operators 52 appropriate for the attribute which can be added to build the search clause 46. In this instance the user can select "Contains" 52A to find documents authored (i.e., created) by an author. Alternatively, the user can select "Does not contain" 52B to eliminate any documents from the search that are created by a particular author. FIG. 6 illustrates the search bar 10 with a revised search clause 46' showing that the comparator term "Contains" has been selected (step 150). The border around the search clause 46' remains open at the right side and no shading is present because a value remains to be added to complete the search clause 46'.

Figure 7:
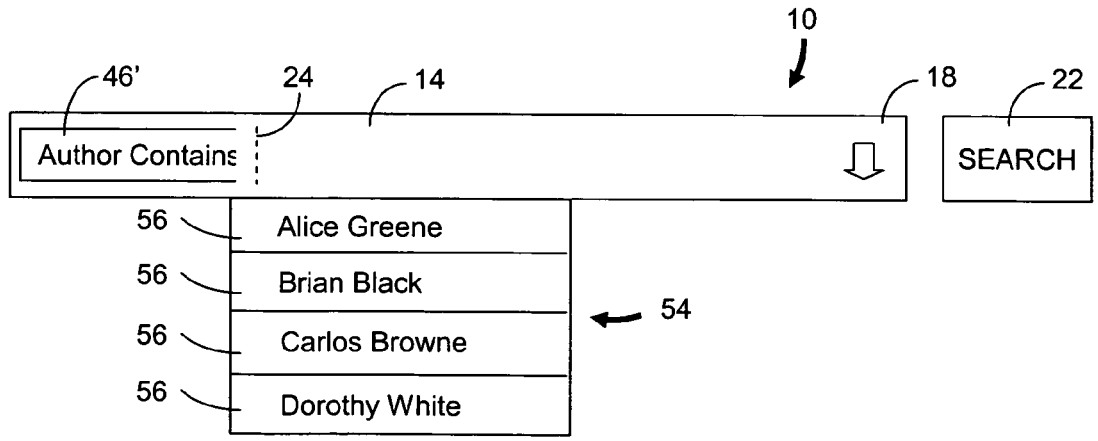
FIG. 7 is an illustration of the search bar of FIG. 6 showing an in-place context menu for the selection of a value.
Figure 8:
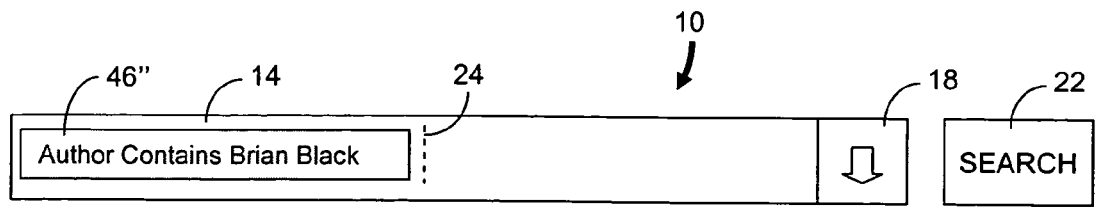
FIG. 8 is an illustration of the search bar of FIG. 7 showing a completed search clause.

An in-place context menu 54 is then displayed (step 160) near the location of the comparison operator in the search clause 46' as shown in FIG. 7 either automatically or according to a user action. The in-place context menu 54 shows values 56 appropriate for the preceding attribute and comparison operator. In the illustrated example the values 56 include the names of authors. FIG. 8 shows the search bar 10 after the user has selected (step 170) the author of the target email message. The search phrase 46" is now complete and therefore it is displayed in a closed rectangular border with shading. In the illustrated example, the second search phrase 46" results in a narrowing of the search to email messages created by Brian Black.

Figure 9:
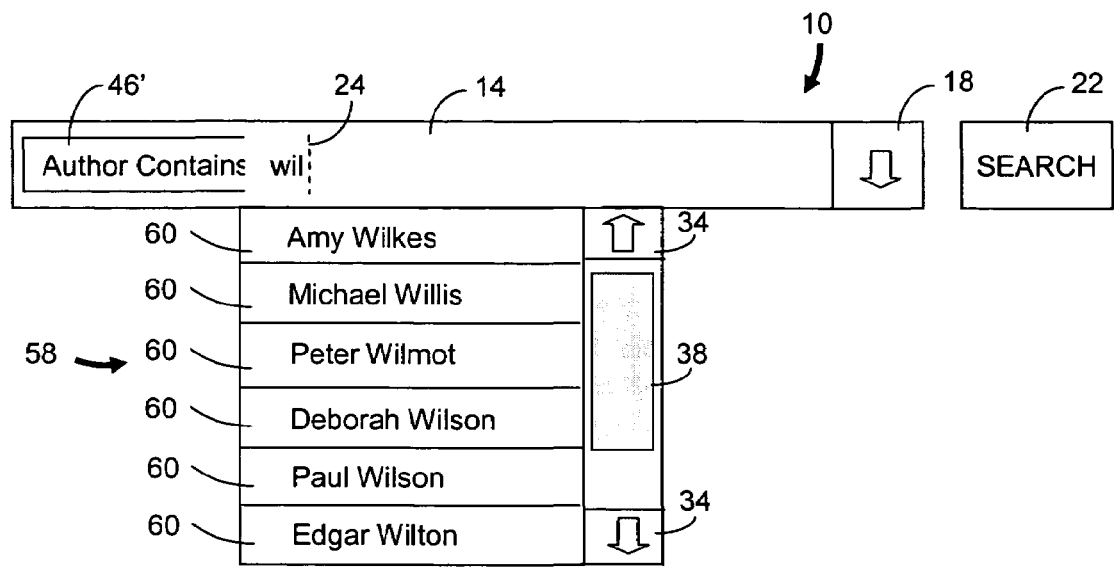
FIG. 9 is an illustration of the search bar of FIG. 6 showing an in-place context menu generated by an auto-complete feature according to an embodiment of the invention.

In an alternative embodiment shown in FIG. 9, the selection (step 170) of the value is initiated by typing text directly into the text box 14 instead of selecting the value from an in-place context menu. An auto-complete feature assists the user in entry of the desired name by dynamically revising a name list displayed in an in-place context menu 58. For example, the auto-complete feature suggests names 60 in a menu based on one or more characters typed by the user and names defined in personal and/or corporate address book files maintained by the user. As shown, the user has entered the letters "wil" and the in-place context menu 58 shows all the names in the user's address books for which the first three letters of the last name are "wil". The user can scroll using the scroll buttons 34 or the sliding scroll bar 38 to select one of the displayed names. Alternatively, the user can continue to enter letters to narrow the number of names in the in-place context menu 58. For example, typing the letter "m" results in the automatic entry of the name "Peter Wilmot" as no other last names start with the four letters "wilm". Entry of text using the auto-complete feature can be extended to the entry of attributes and comparison operators. The auto-complete feature is particularly useful where the number of menu items otherwise presented to a user is excessive.

Figure 10:
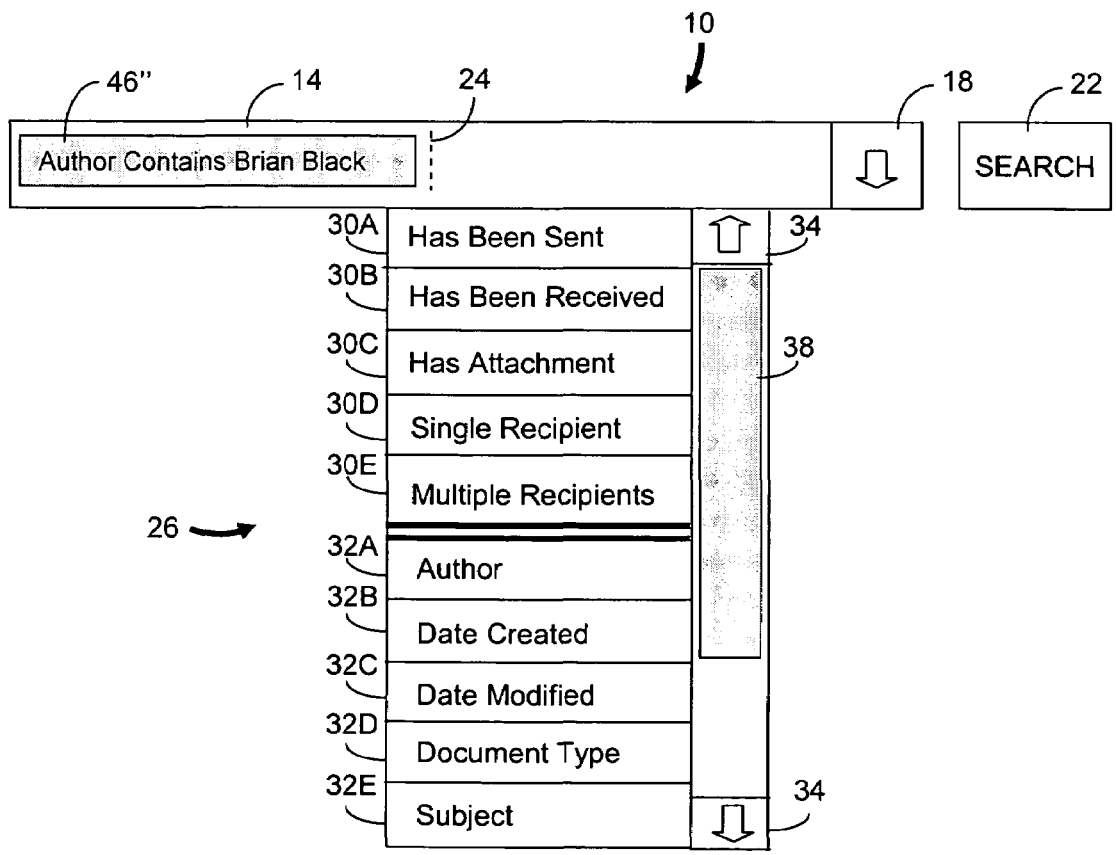
FIG. 10 is an illustration of the search bar of FIG. 9 showing a completed search clause and an in-place context menu for the selection of an abbreviation of a search clause or an attribute.
Figure 11:
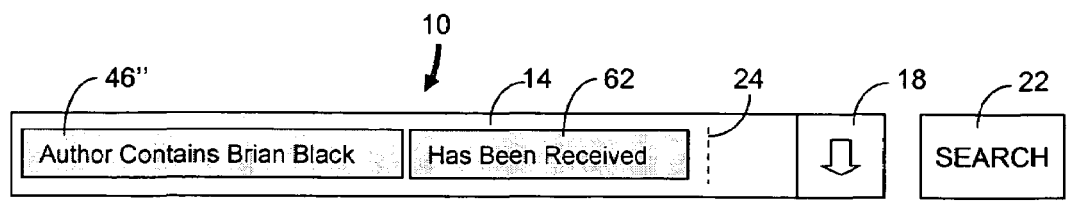
FIG. 11 is an illustration of the search bar of FIG. 10 showing two completed search clauses including one which is depicted by an abbreviation.

After completion of the search clause 46" as shown in FIG. 8, the user can initiate a search by selecting the search button 22. Alternatively, the user can continue to build a search statement by performing another user action (step 180) and adding additional search information in the text box 14. FIG. 10 illustrates the search bar 10 with an in-place context menu 26 permitting the user to select (step 190) from the menu items 30 to insert another search clause at the current text entry position 24. FIG. 11 shows the text box 10 with a second search clause 62 which was selected as the abbreviation "Has Been Received" 30B from the in-place context menu 26. In this instance the abbreviation 30B represents the attribute "Received", the comparison operator "equals" and the logical value "true".

Figure 12:
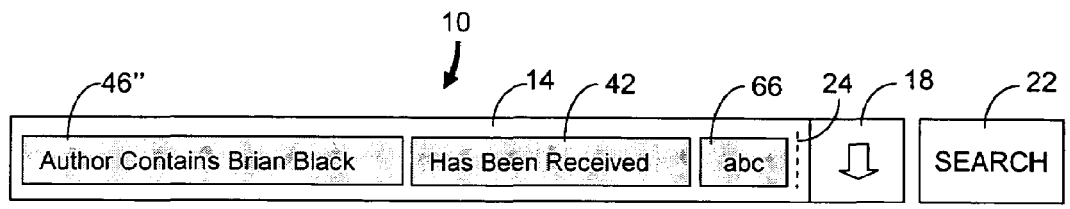
FIG. 12 is an illustration of the search bar of FIG. 11 showing the addition of a third completed search clause represented as an abbreviation.

FIG. 12 shows a search statement which includes the addition of another search clause 66 to the search bar 10 of FIG. 11. The text "abc" was typed directly into the text box 14 by the user. The display of "abc" inside a shaded rectangle indicates that the third search clause 66 is complete and represents "Text includes abc" where "Text" is the attribute, "includes" is the comparison operator and abc is the value of the text to be found. When the user clicks on the search button 22, the completed search statement results in a search for email messages that were received by the user and created by Brian Black. Each email message that is found includes the text "abc" at least once within the text portion of the message.

Although the above description is based on a limited example of a generation of a parametric search statement, it should be recognized that the method can be applied to documents generally. For example, the method 100 of FIG. 1 includes steps 110 to 170 for entering terms used for a single complete search clause and steps 180 to 190 for entering a complete search clause by selection of an abbreviation. It should be recognized that in other embodiments of the method, the particular order of the steps can be varied and groups of steps can be repeated so that the final search statement can includes search clauses created using one or more abbreviations and/or one or more search clauses created by individual entry of an attribute, a comparator operator and a value.

Although the above description is based on specific search parameters, it should be recognized that other parameters are possible. For example, attributes can include the date a document was created, the date the document was modified, the document type, the subject of the document and generic field information. If a user action occurs at a location after a date attribute, the user can select operators such as "is on", "is after", "is before" and the like. If a user action occurs at a location after a document type attribute, a list of subscribed document types can be provided. If a user action occurs after a comparison operator associated with a date attribute, the user can select values such as "today" or "yesterday", or can select a date value from a pop-up calendar.

While the invention has been shown and described with reference to specific embodiments, it should be understood by those skilled in the art that various changes in form and detail may be made therein without departing from the spirit and scope of the invention.

What is claimed is:

1. A method for generating a parametric search statement for finding a target document, the parametric search statement having at least one search clause, the method comprising;

performing a first user action at a first location in a text box of a search bar;

displaying in a computer display a first in-place context menu having a plurality of menu items responsive to the first user action at a location adjacent to the first location in the text box, each menu item comprising;

selecting one of the displayed menu items from the first in-place context menu based on a known characteristic of the target document;

generating a first partial search clause based on the selection of one of the menu items from the first in-place context menu;

displaying the first partial search clause at the first location in the text box of the search bar;

performing a second user action at a second location in the text box;

displaying a second in-place context menu having a plurality of menu items responsive to the first partial search clause at a location adjacent to the second location, each menu item comprising at least one of a comparison operator and a value;

selecting one of the menu items from the second in-place context menu based on the known characteristic of the target document;

generating a second partial search clause based on the selection of one of the menu items from the second in-place context menu; and displaying in the computer display a completed search clause comprising the first partial search clause at the first location in the text box and the second partial search clause at the second location in the text box.

2. The method of claim 1 wherein at least one of the first and second user actions comprises entering text contained in the target document into the text box of the search bar.

3. The method of claim 1 wherein at least one of the first and second user actions comprises performing a user interface function.

4. The method of claim 1 wherein the user action comprises selecting a menu item from the first in-place context menu.

5. The method of claim 1 wherein the target document is one of an email message, a word processing document and a portable document format (pdf) document.

6. The method of claim 1 further comprising revising one of the first and second in-place context menus in response to characters entered in the text box by a user.

* * * * *